Oct. 26, 1965 J. L. D. MORRISON 3,214,176

RECORD CHANGER SPINDLE

Original Filed June 26, 1961 4 Sheets-Sheet 1

INVENTOR.

James L. D. Morrison

BY

Brown, Jackson, Boettcher & Dienner

Att'ys

INVENTOR:
James L. D. Morrison
BY
Brown, Jackson, Boettcher & Dienner
Att'ys

INVENTOR:
James L. D. Morrison
BY
Brown, Jackson, Boettcher & Dienner
Attys.

Oct. 26, 1965 J. L. D. MORRISON 3,214,176

RECORD CHANGER SPINDLE

Original Filed June 26, 1961 4 Sheets-Sheet 4

INVENTOR:
James L. D. Morrison
BY
Brown, Jackson, Boettcher & Dienner
Att'ys

United States Patent Office 3,214,176 Patented Oct. 26, 1965

3,214,176

RECORD CHANGER SPINDLE

James L. D. Morrison, 2045 Mandeville Canyon Road, Los Angeles, Calif.

Continuation of application Ser. No. 119,400, June 26, 1961. This application Sept. 2, 1964, Ser. No. 395,358
8 Claims. (Cl. 274—10)

This application is a continuation of application Serial No. 119,400, filed June 26, 1961, now abandoned.

The present invention relates to spindles for record changers of the type wherein the records are supported on a spindle above a turntable and are dropped to the turntable one at a time by means embodied in the spindle. In particular, the invention concerns an improved spindle of the type having a plurality of record supporting fingers and means for drawing the fingers into the spindle body, and to operating means for the spindle.

Spindles of the character described are known in the art and are comprised, generally, of a tubular spindle body of a diameter slightly less than the center hole in a standard 78 or 33 r.p.m. record, a plurality of record supporting fingers normally projecting outwardly from the spindle for supporting a stack of records on the upper end portion of the spindle, a clutch means mounted on or in the body above said fingers, the clutch means normally being spaced inwardly from the records and being adapted for outward projection from the body to retain all but the bottom record of the stack in predetermined position on the spindle, and a central actuator cam or rod within the spindle cooperable with both the clutch means and said fingers for first projecting the clutch means outwardly from the spindle to hold all but the bottom record in the stack, second drawing said fingers into the spindle to permit the bottom record to fall to the turntable, third returning said fingers to normal position and fourth releasing said clutch means to permit the remaining records in the stack to descend to said fingers.

While spindles of this character have long been the subject of patents, few if any have met with commercial success (except in the case of exceptionally large diameter spindles) because they have not been suited to practical commercial production, have not been foolproof in operation, have subjected the records to extreme abuse and have subjected themselves to such abuse as quickly to be rendered inoperative.

The object of the present invention is to provide an improved spindle of the character described completely overcoming the stated disadvantages of prior art proposals.

A specific object of the invention is the provision of an exceptionally economical spindle well suited to mass production and affording foolproof operational characteristics despite broad manufacturing tolerances.

Another object of the invention is to provide an improved record changing spindle that will handle records with extreme care, and that at the same time will not subject itself to abuse.

A further object of the invention is the provision of an improved record changing spindle wherein the record supporting fingers are movable longitudinally of the spindle body to accommodate engagement of the fingers with the stack of remaining records prior to release of the clutch means, thereby to avoid abuse to the fingers by virtue of dropping the stack to the fingers, and/or to accommodate movement by said fingers of the bottom record in the stack to a position intermediate the stack and the turntable to facilitate sensing of the size of the record next to be played before the record is dropped to the turntable.

A still further object of the invention is the provision of an improved operating means for the spindle for performing the functions and achieving the advantageous results above set forth.

Relative to all the foregoing objects, the crucial purpose of this invention is to provide in a spindle as described independent actuator means for the clutch means and for the record supporting fingers.

Other objects and advantages of the invention will become apparent in the following detailed description.

Now, in order to acquaint those skilled in the art with the manner of making and using my improved spindle and improved spindle operating means, I shall describe, in connection with the accompanying drawings, a preferred embodiment of the spindle and preferred operating means therefor, and the preferred manners of making and using the same.

Figures 4, 5, 6:
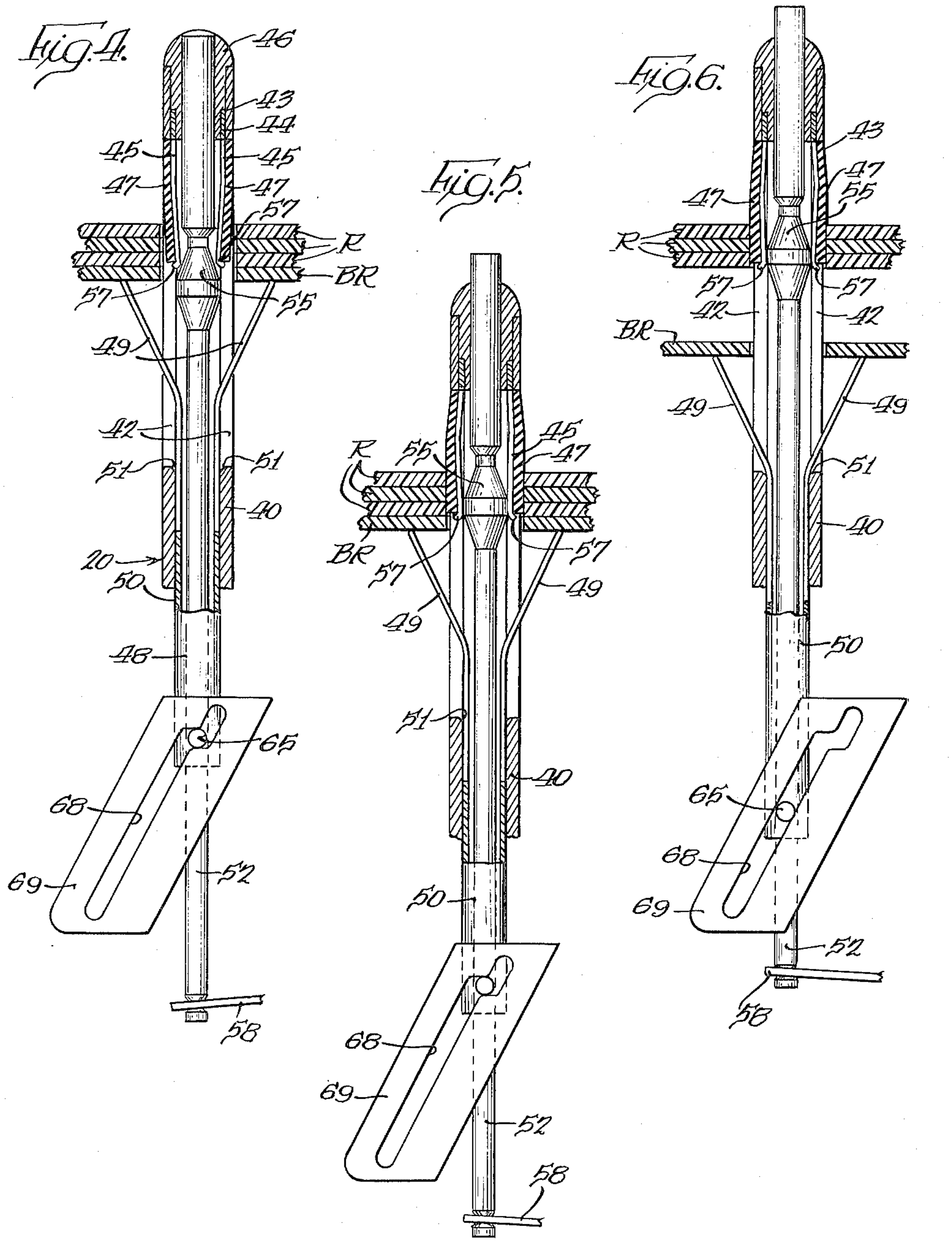

FIGURE 4 is a fragmentary vertical sectional view, taken on an enlarged scale, showing the preferred embodiment of the spindle of the invention in its normal position with a stack of records supported thereon; and FIGURES 5 to 9 are views similar to FIGURE 4 showing the spindle in consecutive positions of operation, namely, clutch-engaging position, record size-sensing position, record dropping position, stack-engaging position and clutch-releasing position, respectively.

Figure 1:
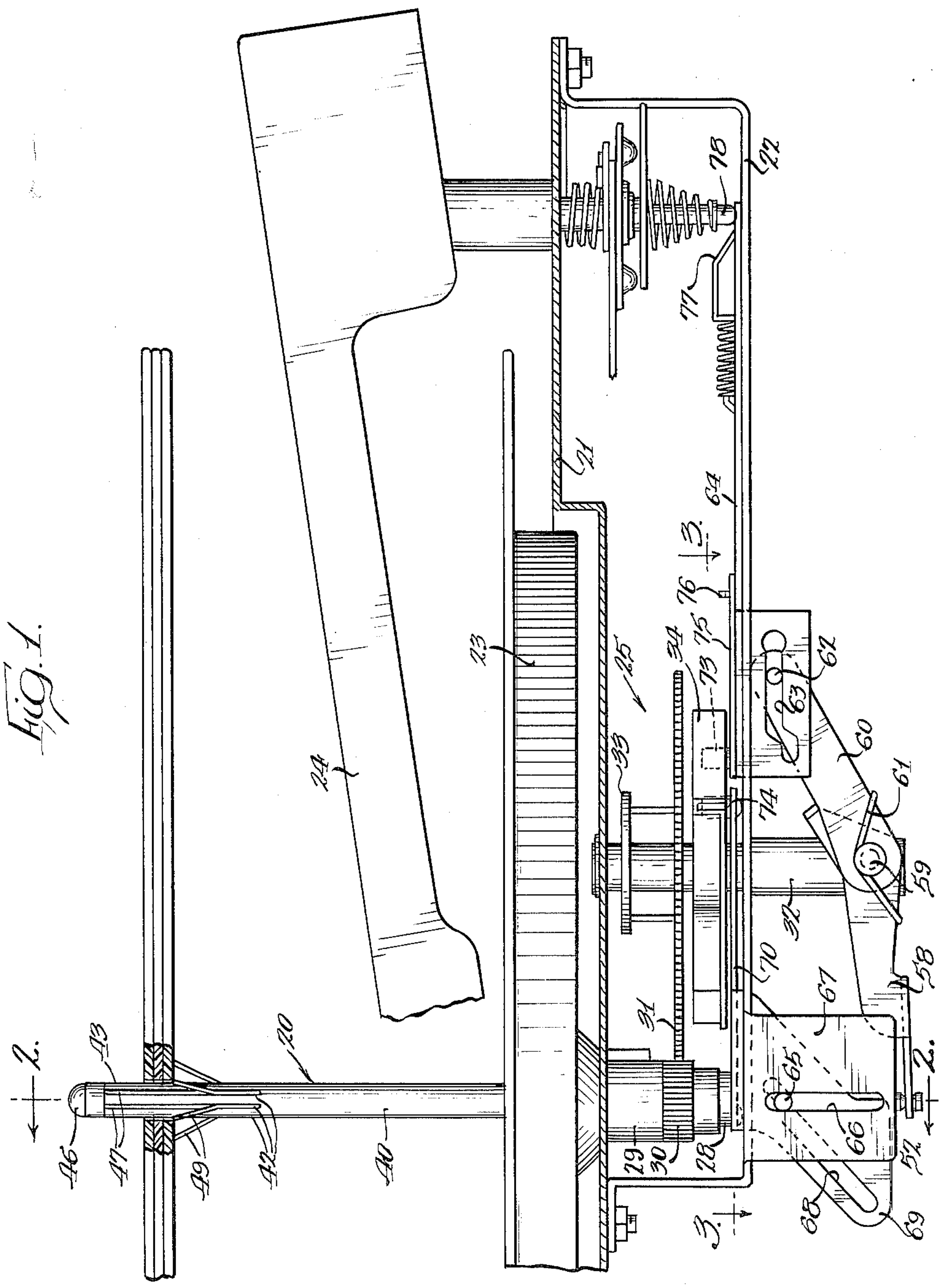
FIGURE 1 is a fragmentary side elevation of a record changer embodying the improved spindle and spindle operating means of this invention.
Figures 2, 3:
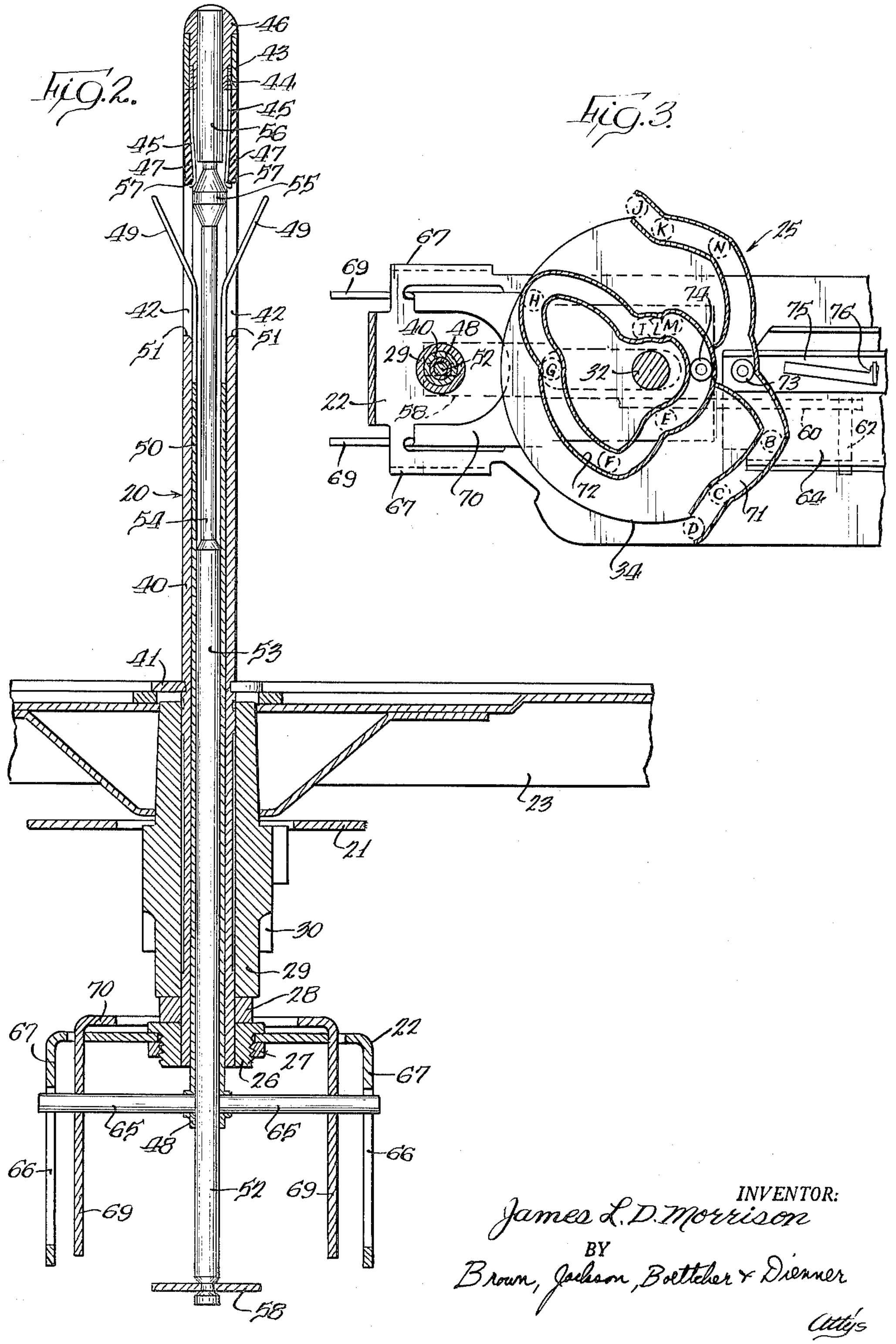
FIGURE 2 is a vertical section, on an enlarged scale, taken substantially on line 2—2 of FIGURE 1 and showing especially my improved spindle.
FIGURE 3 is a fragmentary horizontal section, taken substantially on line 3—3 of FIGURE 1, and showing the spindle operating cam means.

Referring now to the drawings and particularly to FIGURES 1 and 2, I have shown the preferred embodiment of my spindle, indicated at 20, incorporated in a record changer comprising a base plate 21, a supporting bracket 22, a rotatable turntable 23, a tone arm 24 and a mechanism, indicated generally at 25, for raising the tone arm from a record, swinging the tone arm outward beyond the record, actuating the record changing components in the spindle, swinging the tone arm inward to playing position and lowering the tone arm onto the record then uppermost on the turntable. Mechanisms of this character are well known in the art, and the mechanism 25 is depicted herein only to the extent necessary to a full understanding of the subject invention. For a full disclosure of the particular mechanism, reference is made to the copending application of myself and Michael Estkowski, Serial No. 173,465, filed February 15, 1962.

The supporting bracket 22 is rigidly secured to the underside of the base plate and carries thereon the spindle 20 and the operating mechanism 25. In particular, as best shown in FIGURE 2, the spindle adjacent its lower end extends through the bracket 22 and is secured thereto by a collar 26 that is fixed to the spindle and a nut 27 that is threaded on the collar and clampingly engaged with the bracket. Above the collar 26, the spindle carries a bearing 28 which provides an anti-friction support for the hollow shaft 29 of the turntable, which shaft is journalled on the spindle and extends up through the base plate 21 for reception of the turntable. As is conventional in the art, the turntable and its shaft are rotated by an electric motor and friction wheel drive (not shown) at a location remote from the spindle. The turntable shaft in turn serves as the power input means to the mechanism 25, and for this purpose is provided at its lower end with a plurality of circumferentially spaced teeth forming a drive pinion 30. The mechanism 25 includes an interrupted gear 31 which is normally disposed with the interruption therein opposite the pinion, so that the gear is normally idle. As is well known in the art, the mechanism also includes clutch means (not shown) adapted to be actuated automatically upon completion of the playing of a record, or manually at any time, to commence rotation of the gear and bring it into mesh with the pinion, whereupon the pinion will rotate the gear one full revolution until the interruption is again opposite the pinion and the gear stops.

As shown in FIGURE 1, the gear 31 is rotatably mounted on a post 32 intermediate the base plate 21 and the bracket 22 and carries thereon correlated cam discs 33 and 34 which are operative during a single revolution of the gear to raise the tone arm 24, swing the tone arm outwardly beyond the edge of the record, operate the record changing components in the spindle, swing the tone arm back into playing position over the record then uppermost on the turntable and lower the tone arm onto the record. For sake of convenience, the tone arm swinging mechanism, which is operated by the upper cam disc 33, is omitted from this disclosure as it forms no part of this invention.

Referring now to FIGURE 2, the spindle of the present invention comprises an elongate hollow or tubular body 40 of substantially uniform inner and outer diameter throughout its length, except for a counterbore in the upper end portion thereof and a circumferential groove in the outer surface thereof for receiving a C-washer 41 which serves to retain the turntable on the spindle. Intermediate its ends, but adjacent the upper end thereof, the body is provided in its wall with a plurality of elongate longitudinal slots 42, preferably six in number and disposed at equal circumferential spacings. The slots communicate at their upper ends with the lower end of the aforesaid counterbore, whereby a shoulder or ledge is provided at the bottom of the counterbore between each adjacent pair of slots. Fitted within the upper end portion of the spindle body is a clutch member 43 comprising an upper tubular carrier portion 44 and a plurality of depending resilient clutch fingers 45 aligned with and fitting respectively within the slots 42. This member may be formed by milling into the lower end portion of a thin metal tube a plurality of longitudinal slots complementary to the slots 42, thereby to define the fingers 45. Preferably, however, the member 43 is formed from flat sheet metal stock by stamping out of a sheet a flat member including a band-like carrier and depending fingers complemental to the slots 42, and then rolling or bending the stamped member to circular or tubular form. In either event, the outer diameter of the member 43 is approximately equal to the inner diameter of the counterbore in the body, and the member is fitted down into the counterbore to dispose the fingers 45 in the slots 42 and to bring the carrier 44 to rest on the shoulders or ledges defined at the bottom of the counterbore. To secure the clutch member in the body, a tubular insert 46, having a reduced lower extension, is pressed into the counterbore with the extension thereof fitting within the carrier 44. Fixedly to secure the insert in place, portions of the body at the upper end thereof may be rolled or peened into a shallow depression in the insert. To complete the clutch means, a resilient pad 47, to be described in greater detail hereinafter, is fixedly secured to the outer surface of each of the clutch fingers 45. In the normal position thereof, the resilient fingers 45 normally depend substantially vertically downward from the carrier portion 44 thereby normally to locate the resilient pads 47 within the slots 42.

Within the lower end portion thereof, the spindle body 40 slidably mounts a coaxial tubular member 48 comprising, integrally, a plurality of record supporting fingers 49 and an actuator 50 therefor. This member may be formed directly from a tube, but is preferably formed from sheet metal stock in essentially the same manner as described relative to the clutch means or member 43, except in this instance that the fingers are provided at the upper end of the member and are considerably longer than the fingers 45. The tubular body portion of the member 48 comprises the actuator 50 and this extends upwardly from below the lower end of the body to a normal position adjacent the lower ends of the slots 42 in the body. The record supporting fingers 49, preferably six in number, are aligned respectively with the slots 42. Preferably, the fingers are quite long to enhance the flexibility or resiliency thereof, and are bent intermediate their ends so that the upper end portions of the fingers extend diagonally outward and upward through the slots 42 to the exterior of the spindle. The upper ends of the fingers are disposed in a common horizontal plane a significant distance outwardly from the spindle to provide a support for a stack of records. Due particularly to the fact that there are six of the fingers 49, spaced equally about the entire circumference of the spindle body, a very stable support for a stack of records is provided, so stable in fact that the stack of records may be supported exclusively by the spindle without need for the steadying arms or means that have heretofore been conventional in the art.

Since the fingers 49 are joined to the longitudinally movable or slidable actuator 50, the fingers are also slidable longitudinally of the spindle body 40, which affords a great many advantages and facilitates accomplishment of a number of improved results, as will be described. To accommodate such movement, the slots 42 in the body are preferably elongated as shown, and the portions of the body defining the lower margins of the slots 42 are preferably rounded or tapered, as indicated at 51, to comprise cam surfaces for a purpose to be described.

As shown in FIGURE 2, the spindle body 40 is rigidly secured at its lower end to the supporting bracket 22 by means of the collar 26 which is fixed to the body. The tubular member 48 projects below the spindle body and the main plate portion of the bracket 22, thereby to be exposed for access to facilitate operation of the same. Below this is the lower accessible end of a second actuator 52 comprising a rod which extends upwardly through the interior of the tubular actuator 50 to above the record supporting fingers 49 and to adjacent the clutch fingers 45. This rod is slidably mounted in the spindle body within the tube 50 and preferably comprises a cylindrical portion 53 slidably mounted in the tube, a reduced portion 54 extending through the finger area of the member 48, a cam portion 55 preferably having slidable bearing engagement with the spindle body just below the lower ends of the clutch fingers and an upper cylindrical guide portion 56 having slidable bearing engagement in the cylindrical insert 46 at the upper end of the spindle body. The rod 52 comprises the actuator for the clutch fingers and the rod and the fingers are provided with cooperable cam surfaces whereby the rod is movable to project the fingers 45 and the pads 47 outwardly through the slots 42 in the body. In the disclosed embodiment of the invention, these cooperable cam surfaces are comprised of conical cam surface 55 on the rod and inturned portions 57 at the lower ends of the clutch fingers 45.

For effecting actuation thereof, the actuator rod 52 is notched at its lower end for reception of the slotted end portion of an operator lever 58 which is pivotally mounted at 59 on a downwardly extending projection of the post 32. Also pivotally mounted at 59 is an operating link 60 which is operatively connected at one end to the lever 58 by means of a torsion spring 61 and which at its opposite end carries a follower 62 engaging in a cam slot 63 formed in a depending leg portion of a slide 64 which is slidably mounted on the bracket 22.

The actuator tube 48 is provided at its lower end with radially extending follower pins 65 which are received at their outer ends in vertical guide slots 66 provided in a pair of depending extensions 67 of the mounting bracket 22, the said extension being disposed to opposite sides of the tube 48. The follower pins 65 also extend through inclined cam slots 68 provided in a pair of depending legs 69 which project downwardly through slots in the mounting bracket to opposite sides of the tube 48 and which are integrally joined at their upper ends with a slide 70 which is slidably mounted on the upper surface of the bracket 22.

The two slides 64 and 70 are adapted to be operated by correlated cam tracks 71 and 72, respectively, defined in the lower surface of the lower cam 34. The slides are provided with upstanding follower pins 73 and 74, respectively, which engage in the respective cam tracks to the side of the axis of cam rotation opposite the spindle, whereby rotary movement of the gear 31 and the cam 34 imparts horizontal reciprocatory movement to the slides 64 and 70, and thus vertical reciprocatory movement to the actuators 50 and 52, respectively. The follower 74 is suitably secured directly to the slide 70, and the follower 73 may if desired be similarly mounted on the slide 64. To secure the full utility of the spindle, however, it is preferred that the slide 64 be adapted for selective coupling to and uncoupling from the follower 73. To this end, the preferred operating mechanism includes a secondary slide member 75 to which the pin 73 is secured, and clutch means 76 for selectively coupling and uncoupling the slides 64 and 75. The purpose of this arrangement will be described hereinafter, and a detailed disclosure of the arrangement will be found in the said copending Morrison and Estkowski application.

Referring now to FIGURE 3, the cam tracks 71 and 72 are shown in detail in the normal or at-rest position of the gear and cam, in which position the spindle components are disposed as depicted in FIGURES 2 and 4. If the gear is now set in motion, the cam will commence to rotate counterclockwise as viewed in FIGURE 3. Assuming the slides 64 and 75 to be coupled together, as depicted, rotation of the cam through approximately 30 degrees will bring position B in the track 71 into alignment with the follower 73, whereby the follower and the slides 75 and 64 will be moved to the right. During this movement, an inclined ramp 77 at the right-hand end of the slide 64 will engage a tone arm lift pin 78 to raise the tone arm. When the cam has been rotated about 60 degrees, position C in track 71 is brought into alignment with the follower 73, and during movement of the cam through the next 15 degrees or so, to position D, the follower is moved further to the right, whereupon the inclined portion of the cam slot 63 engages the follower pin 62 and moves the link 60 downward, whereupon the lever 58 and the actuator rod 52 are moved upwardly to cause the cam surface 55 on the rod to engage the complementary cam portions 57 of the clutch fingers 45 and move the clutch fingers radially outward to the position shown in FIGURE 5. In this position, the resilent pads 47 on the clutch fingers 45 are biased outward into engagement with certain of the records R in the stack for the purpose of holding all but the bottom record in the stack in fixed position on the spindle.

In this latter regard, it may be stated in a general way that the upper ends of the record supporting fingers 49 are spaced downwarly from the lower ends of the clutch fingers 45 by a distance equal approximately to the thickness of one record, so that the lower ends of the pads 47 will engage essentially in the center hole portion of the second-to-bottom record in the stack. However, since records actually vary in thickness from approximately .055 inch to .125 inch, it is necessary in actual practice to select a spacing between the two sets of fingers that is a medium between the extremes and will permit satisfactory operation under all conditions. In other words, if the spacing were only .055 inch and a thick record were at the bottom of the stack, over one-half the thickness of the bottom record would be engaged by the clutch pads and it is quite likely that the thick record would be held by the pads and prevented from dropping. On the other hand, if the spacing were .125 inch and two of the thinnest records were at the bottom of the stack, neither of the two would be engaged by the clutch and the two thin records would be simultaneously dropped to the turntable. Under the circumstances, I space the two sets of fingers apart by a distance of about .0625 inch in the normal position thereof, whereby no more than one-half of the bottom record, and no less than about 85% of the second-from-the-bottom record, can be engaged by the clutch. Since records or progressively increasing thickness are of progressively increasing weight, a thick bottom record engaged in part by the clutch will slip off the clutch due to its own weight. Yet, in the case of a second-from-the-bottom record, engagement of the clutch over at least 85% of its thickness insures that the same will be retained on the spindle with the stack. For convenience herein, I will continue to refer to the thickness of one record, but in doing so it is to be understood that I have due reference to the immediately preceding discussion.

In order to alleviate the work of the clutch, as would be incurred if the entire clutching effort were exerted solely on the second-from-the-bottom record in a stack of records, which may weigh up to 10 pounds or so, I shape the pads 47 and/or the clutch fingers 45 so that clutching effort is applied over a number of the records at the bottom of the stack. Sepecifically, I initially make the pads 47 thicker than necessary, expand the clutch by means of the cam 55, and then grind or otherwise work the pads to the desired finished diameter of the expanded clutch. In so doing, I grind the pads to cylindrical form concentric with the spindle over that portion of the pads that was greater than the desired final outer diameter, thereby to form an elongate cylindrical clutch surface, as depicted in FIGURE 5, which is clutchingly engageable with a plurality of records. Thereafter, I release the clutch and grind away the upper end portions of the pads flush with the spindle body so that the pads do not project from the body in the released position of the clutch.

Referring again to FIGURE 3, the cam tracks 71 from the position D to position J is simply a circular surface concentric with the axis of the cam, so that the tone arm lift pin and the spindle clutch and its actuator are retained in the positions last described for the next 190 degrees of cam rotation, i.e., from about 75 degrees to 265 degrees in the single revolution of the cam.

For the first 75 degrees of cam rotation, the cam track 72 is concentric with the cam axis so that the pin 74 and the slide 70 are not actuated during this period. After the clutch member 43 has been engaged, as shown in FIGURE 5, the cam track 72 in moving the pin 74 from position E to position F (75 degrees to 115 degrees of cam rotation) moves the slide 70 to the right to a position wherein the leg 69 thereof is disposed as shown in FIGURE 6. In this position, the cam slot 68 has moved the pin 65 and thus the tube 50 and the record supporting fingers 49 downwardly a predetermined distance, as determined by the cam track 72. The slots 42 in the spindle body 40 are of a length to accommodate this initial downward movement of the fingers 49, whereby the bottom record BR is lowered to and supported in a position intermediate the stack and the turntable, in which position the record is individually accessible by suitable record size-sensing means (not illustrated in detail herein) of types known to the art or as shown in the previously identified copending application. The record is held in this size-sensing position, as shown in FIGURE 6, by the concentric portion of the cam track 72 lying between positions F and G (115 degrees to 180 degrees of cam rotation).

Figures 7, 8, 9:
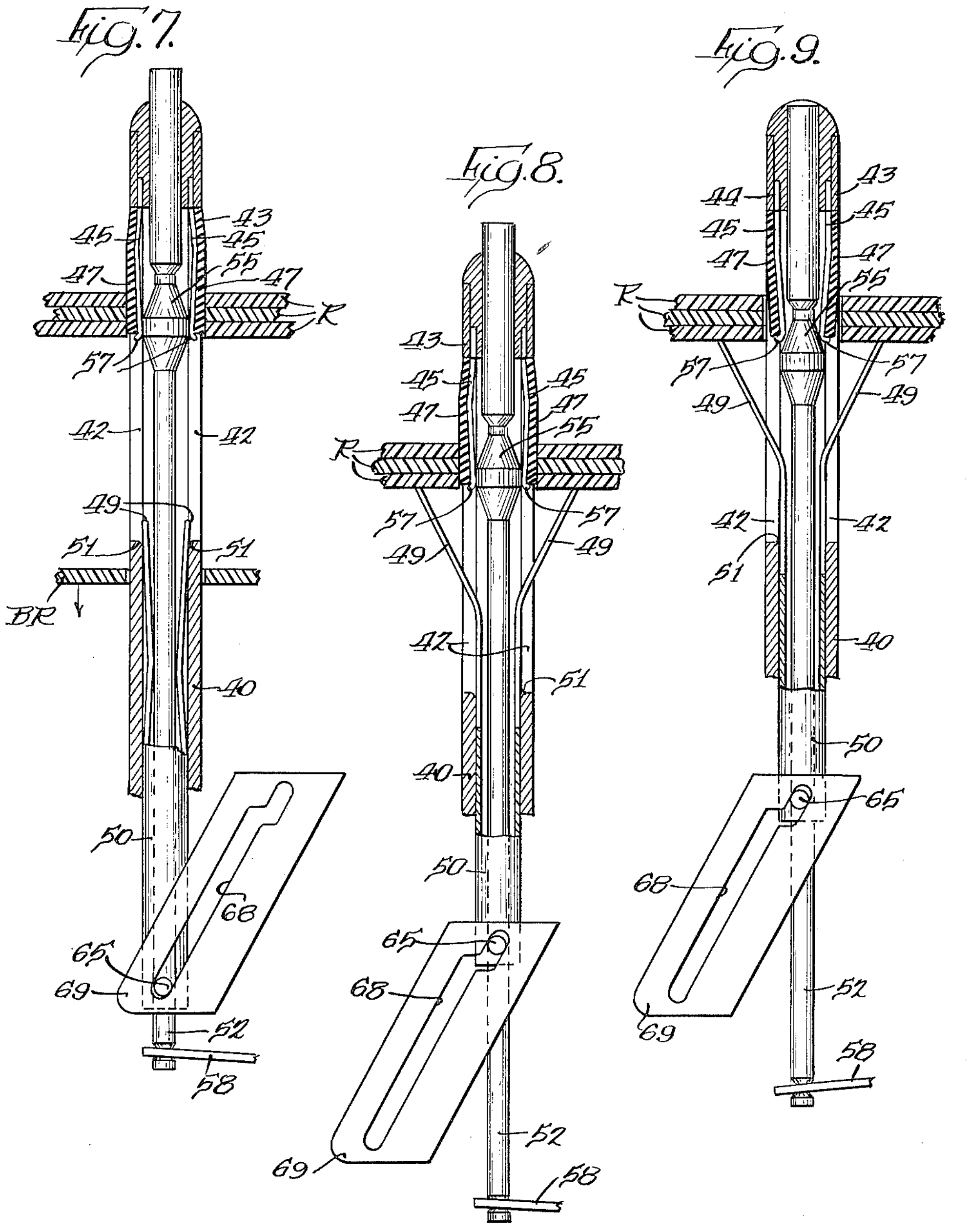

The cam track 72 in moving the pin 74 from position G to position H (180 degrees to 210 degrees of cam rotation) moves the pin 74 and slide 70 further to the right to cause the cam track 68 to move the pin 65 and the record supporting finger member 48 to the fully retracted position shown in FIGURE 7. During this movement, the resilient fingers 49 are pulled down against the cam surfaces 51 defined at the bottoms of the slots 42 and are thereby forced inwardly into the interior of the spindle body. As the upper ends of the fingers move into the slots 42, the bottom record BR is released to fall to the turntable. As the record falls, the air between the descending record and the turntable (or the records resting on the turntable) serves as a cushion so that the record descends gently to the turntable and is not subject to abuse.

The cam track 72 thereupon moves the pin 74 to the left, from position H to position I (210 degrees to 260 degrees of cam rotation) which causes the record supporting finger member 48 to be moved upwardly past its normal position to a fully elevated position (FIGURE 8) wherein the record supporting fingers 49 engage the lower surface of the record then at the bottom of the stack. The clutch member 43 is then released, by virtue of the cam track 71 moving the pin 73 from position J to position K (265 degrees to 275 degrees of cam rotation) whereupon the clutch fingers and pads move inwardly to release the stack and the stack becomes fully supported by the fingers 49, as shown in FIGURE 9. During release of the clutch, the records of course do not move downwardly since they are already fully supported by disposition of the fingers 49 in their uppermost stack-engaging position.

The cam track 72 then moves the pin 74 from position L to position M (280 degrees to 290 degrees of cam rotation), whereupon the fingers 49 and the stack are returned to the starting position shown in FIGURE 4. To avoid undue stress on the driving elements, the pin 65 in this position preferably rests on a horizontal shoulder defined on the legs 69 by a short horizontal track portion formed in the cam slots 68.

The cam 34 then returns to zero position during which time (300 degrees to 360 degrees of cam rotation) the track 71 so moves the pin 73, slide 64 and ramp 77 as to lower the tone arm onto the record then uppermost on the turntable.

Thus, it is to be seen that in one revolution of the cam 34, the spindle components are operated to cause the clutch to engage and hold all but the bottom record in the stack, to cause the record supporting fingers 49 to lower the bottom record to size-sensing position and to hold the record in such position, to cause the fingers 49 to release the bottom record for descent to the turntable, to move the fingers 49 up to stack-engaging position, to release the clutch and thereby the stack for support by the fingers 49, and finally to return the fingers 49 and the stack to starting position. During this cycle of movement, the records are handled with extreme care and the spindle components are not subjected to abusive treatment, such as that occasioned with prior art devices wherein the stack was dropped from the clutch means to the record supporting fingers. Relative to the complete cycle, it is to be appreciated, of course, that certain steps may be omitted if desired. For example, movement of the bottom record to size-sensing position could be omitted, in which case it would not be necessary to have the slots 42 as long as they are depicted in the present disclosure.

When a stack of records has been played, and the spindle is in the condition shown in FIGURE 4, to which condition it is always returned at completion of playing, the stack of records may be removed from the turntable simply by lifting them upwardly off the spindle, the finfiers 49 readily collapsing into the interior of the spindle as the records pass upwardly thereover so as not to interfere with their removal.

In addition to the foregoing, the spindle of the invention facilitates conversion of a fully automatic record changer into a fully manual record player wherein records may be manually threaded down the spindle to the turntable without obstruction in their descent to or subsequent removal from the turntable. For this purpose, it is necessary to have the clutch released and to have the fingers 49 drawn into the interior of the spindle, a condition not achieved in the above-described automatic operation. Suitable mechanism for this purpose is disclosed in detail in the previously identified co-pending application, and it will suffice to state herein that such mechanism is provided with the secondary slide 75 and clutch or detent means 76 and with a normally closed second interruption in the gear 31, the said second interruption being located at a position substantially diametrically opposite position H on the cam track 72. In use of this apparatus, the second interruption is opened and the secondary slide 75 is swung counterclockwise as viewed in FIGURE 3 to align a clutch or detent tab on the slide 64 with a slot in the secondary slide. The gear 31 is then set in operation, whereupon the cam track 71, while reciprocating the slide 75, is unable to impart movement to the slide 64 due to disconnection of the two slides. Consequently, the clutch actuating rod 52 and the clutch member 43 are not actuated, and the clutch fingers remain in their relaxed normal condition. However, the cam track 72 is operable to effect movement of the pin 74 to approximately position H, in which position (FIGURE 7) the record supporting fingers 49 are retracted into the interior of the spindle body. At this point, the second interruption in the gear 31 becomes aligned with the pinion 30, whereupon the gear and the cam 34 stop to leave the spindle in a condition such that nothing projects from the spindle body, and the body comprises an upstanding cylindrical pin of a diameter less than the center hole in a record adapted for guiding a record concentrically to the turntable.

From the foregoing, it is to be appreciated that the present invention provides an improved record changer spindle and improved operating means therefor especially characterized by a pair of actuators operatively associated respectively with the clutch means and the record supporting means of the spindle for operating the same individually, thereby to provide a new and novel mode of operation and to accomplish new and particularly advantageous results. Provision of two separate actuators, together with the described details of construction, also facilitates extremely economical production of the spindle by mass production methods, and results in a spindle that is foolproof in operation, that handles records in a most gentle manner, and that does not subject itself to abuse whereby the same may enjoy a long service life. Thus, it is apparent that I have attained all of the objects of this invention in a most convenient, economical and practical manner.

While I have shown and described what I regard to be the preferred embodiment of my improved spindle, and the preferred embodiment of operating means therefor, it is to be appreciated that various changes, rearrangements and modifications may be made therein without departing from the scope of the invention, as defined by the appended claims.

I claim:

1. In a record changer, an upright hollow spindle body having apertures therein, record engaging clutch means mounted in said body adjacent the upper end thereof adapted for outward projection through said apertures, record supporting finger means mounted in said body for movement longitudinally of said body, said record supporting finger means normally projecting outwardly through said apertures below said clutch means and normally being spaced below said clutch means by a distance approximately equal to the thickness of a record, a first actuator movably mounted in said body and extending from one end of the body to adjacent said clutch means, said first actuator being operatively engageable with said clutch means for projecting the same outwardly through said apertures, a second actuator movably mounted in said body and extending from one end of the body to adjacent said record supporting finger means, said second actuator having operative connection with said record supporting finger means for moving the same longitudinally of said body and for drawing the same into said body, and operating means operatively associated with said actuators and adapted to operate the same in the predetermined sequence of operating said first actuator to project said clutch means outwardly through said apertures and for then holding said clutch means in outwardly projected position, operating said second actuator for moving said record supporting finger means downwardly a predetermined distance and holding the same in such lowered position, operating said second actuator for drawing said record supporting finger means into said body, operating said second actuator for releasing said record supporting finger means for outward projection from said body and operating said first actuator for releasing said clutch means.

2. In a record changer, an upright hollow spindle body having apertures therein, record engaging clutch means mounted in said body adjacent the upper end thereof adapted for outward projection through said apertures, record supporting finger means mounted in said body for movement longitudinally of said body, said record supporting finger means normally projecting outwardly through said apertures below said clutch means and normally being spaced below said clutch means by a distance approximately equal to the thickness of a record, a first actuator movably mounted in said body and extending from one end of the body to adjacent said clutch means, said first actuator being operatively engageable with said clutch means for projecting the same outwardly through said apertures, a second actuator movably mounted in said body and extending from one end of the body to adjacent said record supporting finger means, said second actuator having operative connection with said record supporting finger means for moving the same longitudinally of said body and for drawing the same into said body, and operating means operatively associated with said actuators and adapted to operate the same in the predetermined sequence of operating said first actuator to project said clutch means outwardly through said apertures and for then holding said clutch means in outwardly projected position, operating said second actuator for drawing said record supporting finger means into said body, operating said second actuator for releasing said record supporting finger means for outward projection from said body, operating said second actuator for moving said record supporting finger means upwardly to substantially the same height as said clutch means, operating said first actuator for releasing said clutch means and operating said second actuator for returning said record supporting finger means to the said normal position thereof.

3. In a record changer, an upright hollow spindle body having apertures therein, record engaging clutch means mounted in said body adjacent the upper end thereof adapted for outward projection through said apertures, record supporting finger means mounted in said body for movement longitudinally of said body, said record supporting finger means normally projecting outwardly through said apertures below said clutch means and normally being spaced below said clutch means by a distance approximately equal to the thickness of a record, a first actuator movably mounted in said body and extending from one end of the body to adjacent said clutch means, said first actuator being operatively engageable with said clutch means for projecting the same outwardly through said apertures, a second actuator movably mounted in said body and extending from one end of the body to adjacent said record supporting finger means, said second actuator having operative connection with said record supporting finger means for moving the same longitudinally of said body and for drawing the same into said body, first cam means operatively engaging said first actuator adjacent the end of the body for imparting movement thereto, second cam means operatively engaging said second actuator adjacent the end of the body for imparting movement thereto, and operating means for said cam means for (1) operating said first cam means to impart movement to said first actuator for projecting said clutch means outwardly through said apertures and for then holding said clutch means in outwardly projected position, (2) operating said second cam means to impart movement to said second actuator for moving said record supporting finger means downwardly a predetermined distance and holding the same in such lowered position, (3) operating said second cam means to impart movement to said second actuator for drawing said record supporting finger means into said body, (4) operating said second cam means to impart movement to said second actuator for releasing said record supporting finger means for outward projection from said body, (5) operating said second cam means to impart movement to said second actuator for moving said record supporting finger means upwardly to substantially the same height as said clutch means, (6) operating said first cam means to impart movement to said first actuator for releasing said clutch means and (7) operating said second cam means to impart movement to said second actuator for returning said record supporting finger means to the said normal position thereof.

4. In a record changer, a spindle comprising an upright tubular body having a plurality of longitudinal slots therein intermediate the ends thereof, a clutch finger assembly comprising a carrier mounted in said body adjacent the upper end thereof and a plurality of depending resilient clutch fingers aligned respectively with said slots, a record supporting finger assembly slidably mounted in said body and comprising a tubular portion extending upwardly into the body from the lower end thereof to above the lower ends of said slots and a plurality of outwardly and upwardly inclined resilient record supporting fingers alinged respectively with and extending through said slots, said record supporting fingers normally being spaced downwardly from said clutch fingers by a distance approximately equal to the thickness of a record, a clutch finger actuating rod slidably mounted in said body within said tubular portion and extending upwardly from the lower end of said body through said tubular portion to adjacent the lower ends of said clutch fingers, said clutch fingers and said rod having cooperable cam surfaces for moving said clutch fingers radially outward upon sliding movement of said rod relative to said clutch fingers, and first and second cam means correlated to one another and operatively associated respectively with said rod and said tubular portion adjacent the lower end of said body for operating the same in the sequence of moving said rod in one direction to move the lower ends of said clutch fingers outwardly relative to said body, moving said tubular portion downward to engage said record supporting fingers with the portions of the body defining the lower margins of said slots and thereby draw the record supporting fingers into said body, moving said tubular portion upward beyond its normal position to dispose the upper ends of said record supporting fingers substantially level with the lower ends of said clutch fingers, moving said rod in the opposite direction to release said clutch fingers and moving said tubular portion downward to its normal position.

5. In a record changer, a spindle comprising an upright tubular body having a plurality of elongate longitudinal slots therein intermediate the ends thereof, a clutch finger assembly comprising a carrier mounted in said body adjacent the upper ends thereof and a plurality of depending resilient clutch fingers aligned respectively with said slots, a record supporting finger assembly slidably mounted in said body and comprising a tubular portion extending upwardly into the body from the lower end thereof normally to a position well above the lower ends of said slots, and a plurality of outwardly and upwardly inclined resilient record supporting fingers aligned respectively with and extending through said slots, said record supporting fingers normally being spaced downwardly from said clutch fingers by a distance approximately equal to the thickness of a record, a clutch finger actuating rod slidably mounted in said body within said tubular portion and extending upwardly from the lower end of said body through said tubular portion to adjacent the lower ends of said clutch fingers, said clutch fingers and said rod having cooperable cam surfaces for moving said clutch fingers radially outward upon sliding movement of said rod relative to said clutch fingers, and first and second cam means correlated to one another and operatively associated respectively with said rod and said tubular portion adjacent the lower end of said body for operating the same in the sequence of moving said rod in one direction to move the lower ends of said clutch fingers outwardly relative to said body, moving said tubular portion downwardly to move said record supporting fingers downward a predetermined distance and hold the same in such lowered position, moving said tubular portion downward to engage said record supporting fingers with the portions of the body defining the lower margins of said slots and thereby draw the record supporting fingers into said body, moving said tubular portion upward beyond its normal position to dispose the upper end of said record supporting fingers substantially level with the lower ends of said clutch fingers, moving said rod in the opposite direction to release said clutch fingers and moving said tubular portion downward to its normal position.

6. In a record changer spindle of the type having an upright tubular body with a plurality of circumferentially spaced longitudinal slots intermediate the ends thereof and a plurality of record supporting fingers which are extendable outwardly through said slots to support a stack of records on the spindle and which are retractable within said slots to inoperative positions, the improvement comprising a clutch finger assembly operative when said record supporting fingers are retracter for supporting all but the lowermost one of a plurality of records disposed on said spindle, said clutch finger assembly including, in combination, clutch finger mounting means fixedly positioned proximate the upper end of said spindle, a plurality of resilient clutch fingers secured at their upper ends to said mounting means and depending downwardly therefrom in alignment with corresponding ones of said longitudinal slots and with the lower ends of said clutch fingers adjacent the next-to-lowermost record in a stack of records supported on said record supporting fingers, a resilient pad mounted on the radially outer portion of each of said clutch fingers and positioned within a corresponding longitudinal slot, said clutch fingers being biased to radially inner inoperative positions wherein said pads are retracted within said slots, and actuating means disposed within said tubular body for engagement with said clutch fingers for moving the latter outwardly through said slots to radially outer operative positions for gripping records disposed on said spindle adjacent said pads, the radially outer surfaces of said pads being formed so as to slope downwardly and inwardly when said clutch fingers are retracted and to extend vertically when said clutch fingers are operatively extended whereby in their radially extended positions said pads throughout at least the major portion of their length define a cylindrical surface concentric with said tubular body so as to exert gripping pressure on several records in addition to the next-to-lowermost record in a stack of records disposed on said spindle.

7. In a record changer spindle of the type having an upright tubular body with a plurality of circumferentially spaced longitudinal slots intermediate the ends thereof and a plurality of record supporting fingers which are extendable outwardly through said slots to support a stack of records on the spindle and which are retractable within said slots to inoperative positions, the improvement comprising a clutch finger assembly operative when said record supporting fingers are retracted for supporting all but the lowermost one of a plurality of records disposed on said spindle, said clutch finger assembly including, in combination, clutch finger mounting means fixedly positioned proximate the upper end of said spindle, a plurality of resilient clutch fingers secured at their upper ends to said mounting means and depending downwardly therefrom in alignment with corresponding ones of said longitudinal slots and with the lower ends of said clutch fingers adjacent the next-to-lowermost record in a stack of records supported on said record supporting fingers, a resilient pad mounted on the radially outer portion of each of said clutch fingers and positioned within a corresponding longitudinal slot, said clutch fingers being biased to radially inner inoperative positions wherein said pads are retracted within said slots, and a clutch finger actuating rod slidably mounted in said tubular body and extending upwardly from the lower end thereof to the lower ends of said clutch fingers, said clutch fingers and said rod having cooperable cam surfaces whereby upon sliding movement of said rod relative to said clutch fingers the latter are moved outwardly through said slots to radially outer operative positions for gripping records disposed on said spindle adjacent said pads, the radially outer surfaces of said pads being formed so as to slope downwardly and inwardly when said clutch fingers are retracted and to extend vertically when said clutch fingers are operatively extended whereby in their radially extended positions said pads throughout at least the major portion of their length define a cylindrical surface concentric with said tubular body so as to exert gripping pressure on several records in addition to the next-to-lowermost record in a stack of records disposed on said spindle.

8. In a record changer of the type having an upright tubular body with a plurality of circumferentially spaced longitudinal slots intermediate the ends thereof, and a record supporting finger assembly slidably mounted in said body including a tubular portion extending upwardly into the body from the lower end thereof to above the lower end of said slots and a plurality of record supporting fingers which are extendable outwardly through said slots to support a stack of records on the spindle and which are retractable within said slots to inoperative positions, the improvement comprising a clutch finger assembly operative when said record supporting fingers are retracted for supporting all but the lowermost one of a plurality of records disposed on said spindle, said clutch finger assembly including, in combination, a carrier fixedly mounted in the tubular body of the spindle adjacent the upper end thereof, a plurality of resilient clutch fingers secured at their upper ends to said carrier and depending downwardly therefrom in alignment with corresponding ones of said longitudinal slots and with the lower ends of said clutch fingers adjacent the next-to-lowermost record in a stack of records supported on said record supporting fingers, a resilient pad mounted on the radially outer portion of each of said clutch fingers and positioned within a corresponding longitudinal slot, said clutch fingers being biased to radially inner inoperative positions wherein said pads are retracted within said slots, and a clutch finger actuating rod slidably mounted in said body within the tubular portion of the record supporting finger assembly and extending upwardly from the lower end of said body to the lower ends of said clutch fingers, said clutch fingers and said rod having cooperable cam surfaces whereby upon sliding movement of said rod relative to said clutch fingers the latter are moved outwardly through said slots to radially outer operative positions for gripping records disposed on said spindle adjacent said pads, the radially outer surfaces of said pads being formed so as to slope downwardly and inwardly when said clutch fingers are retracted and to extend vertically when said clutch fingers are operatively extended whereby in their radially extended positions said pads throughout at least the major portion of their length define a cylindrical surface concentric with said tubular body so as to exert gripping pressure on several records in addition to the next-to-lowermost record in a stack of records disposed on said spindle.

References Cited by the Examiner

UNITED STATES PATENTS 3,083,022 3/63 Hansen ---------------- 274—10

OTHER REFERENCES

German application No. 1,038,785, September 1958, 274–10S.

NORTON ANSHER, *Primary Examiner.*